United States Patent [19]

Salts

[11] 4,199,287
[45] Apr. 22, 1980

[54] METHOD AND APPARATUS FOR STACKING BLOCK-LIKE ARTICLES

[75] Inventor: Thomas R. Salts, Roanoke, Ill.

[73] Assignee: Besser Industries, Inc., Roanoke, Ill.

[21] Appl. No.: 914,986

[22] Filed: Jun. 12, 1978

[51] Int. Cl.² .............................................. B65G 57/30
[52] U.S. Cl. ........................................ 414/68; 414/95; 414/786
[58] Field of Search .................... 214/6 P, 6 A, 6 BA, 214/152; 271/212; 414/68, 92, 95, 96, 786

[56] References Cited

U.S. PATENT DOCUMENTS

| 2,703,182 | 3/1955 | Broberg et al. | 214/6 P X |
| 2,997,187 | 8/1961 | Burt | 214/6 P |
| 3,294,257 | 12/1966 | Davies et al. | 214/6 P |
| 3,323,662 | 6/1967 | Danielsson et al. | 214/6 BA |
| 3,442,400 | 5/1969 | Roth et al. | 214/6 P |
| 3,448,867 | 6/1969 | Raynor et al. | 214/6 P |
| 3,627,149 | 12/1971 | Arnemann | 214/6 BA |

*Primary Examiner*—L. J. Paperner
*Attorney, Agent, or Firm*—Learman & McCulloch

[57] ABSTRACT

Method and apparatus for assemblying concrete block or other non-fragile block-like articles into multi-tiered stacks or "cubes". Individual tiers of blocks are formed and cyclically fed in succession onto a stationary work table. An elevating frame carries a clamp assembly operable to compressively grip an individual tier on the work table from opposite sides of the tier. When an individual tier on a work table is thus clamped, the elevating frame is raised to elevate the gripped tier about the work table to a height such that another tier can be fed onto the work table in underlying relationship to the gripped tier. The elevated tier is then lowered by the elevating frame until the gripped tier is supported upon the tier now located on the work table. At this point, the clamp assembly is released and the elevating frame is fully lowered so that the clamp assembly can now be applied to grip the lower tier supported upon the work table. The elevating frame is then again elevated, now carrying two tiers one supported on the other, and a third tier is fed onto the table for a repetition of the process. The apparatus also includes support tines on the elevating frame which are projected into underlying relationship with the lowermost tier at the time this tier is engaged by the clamp assembly. The tines are vertically movable between rollers which form the work table surface and are withdrawn from beneath the lowermost tier in an initial stage of the elevating frame lowering process. In normal operation, the tines do not supportingly engage the blocks, but do provide a safety support system.

9 Claims, 19 Drawing Figures

METHOD AND APPARATUS FOR STACKING BLOCK-LIKE ARTICLES

BACKGROUND OF THE INVENTION

The present invention is especially designed to assemble stacks or "cubes" of concrete block in which each tier of the multi-tiered stack will consist of several blocks, as for example twelve blocks arranged in four rows and three columns. Because each tier or layer is made up of a plurality of individual articles, most prior art arrangements for forming such stacks have found it necessary at some stage to locate a support platform beneath the tier which must subsequently be withdrawn from beneath the tier to deposit the supported tier upon an underlying tier. Since the platform must be of finite thickness, this requires the articles to tilt and drop from the retracting edge of the support platform. Other arrangements employ cooperating interleaving tine systems in which the load is transferred from one tine system to the other in alternation, such arrangements requiring a rather complex mechanical system—see for example Thibault U.S. Pat. No. 3,904,045.

SUMMARY OF THE INVENTION

In a machine embodying the present invention, concrete blocks to be stacked are fed lengthwise in single line along an infeed conveyor onto a first work table, defined by conveyor rollers, upon which a single column of blocks is accumulated in head-to-tail relationship. When a column is accumulated, a set of transfer fingers engages one side of the column and transfers the column laterally across the first work table onto an accumulation table. The transfer fingers are retracted below the surface of the first work table during their return movement so that the formation of a second column of blocks from the infeed conveyor can proceed while the transfer fingers are returning to their transfer position. Upon the accumulation of a second column the transfer fingers again transfer the column laterally onto the accumulation table, the second column of block pushing the first column laterally on the accumulation table. The process is repeated until an entire tier or layer of block has been formed on the accumulation table.

At this time, a pusher pushes the accumulated tier longitudinally from the accumulation table onto a stacking table whose surface is defined by idler rolls which are lightly braked. The assembled tier is thus located at a predetermined position upon the stacking table.

An elevating frame is located below the tier receiving stacking table and projects upwardly above opposite sides of the table. At one side of the table, the elevating frame carries a fixed clamping member which extends the entire length of the tier of blocks supported upon the work table. At the opposite side, individual clamping pads are mounted in line in opposed relationship to the opposite side of the layer of blocks supported upon the work table. The clamping pads are driven simultaneously into engagement with the block to force the block against the stationary clamping member, thus aligning the opposite sides of the tier of blocks and at the same time supplying a compressive grip to the opposed sides of the tier. At the same time, a series of tines carried by the elevating frame are driven horizontally between the rollers of the work table into slightly spaced underlying relationship with the tier of blocks. The tines are projected from both opposite sides of the tier and, when projected, each set of tines extend halfway across the bottom surface of the tier.

The elevating frame is then elevated to lift the tier of blocks upwardly from the stacking table to a height such that the tines which underlie the clampingly gripped tier are spaced a distance above the stacking table so that a second tier of blocks can be advanced onto the stacking table in underlying relationship to the elevated tier which is gripped by the clamping devices on the elevating frame. During normal operation, the tines do not actually engage the lower surfaces of the blocks, but do underlie the entire tier so that if the clamping mechanism does not successfully hold all of the blocks in the elevated tier, the blocks would not drop back downwardly to the stacking table.

When a second tier of blocks is located on the stacking table, the elevating frame is lowered until the projected tines are just slightly clear of the top of the tier of blocks supported on the stacking table. At this point, further lowering movement of the elevating frame is stopped temporarily while the tines are withdrawn from between the two layers of block. The elevating frame is then lowered another short distance until the layer of block gripped by the clamping device on the elevating frame rests upon the second layer of block which is supported upon the stacking table. At this time, further lowering movement of the elevating frame is again temporarily stopped and the movable clamping pads are retracted clear to release the grip of the clamping mechanism on the upper layer of block. Upon retraction of the clamping pads, the elevating frame is then lowered to its fully lowered position. Upon arrival of the elevating frame at its lowered position, the movable clamping pads are again actuated to clampingly engage the lower layer of block, and the tines are extended, as before. With the lower tier of block firmly gripped by the clamping device, and the tines in their projected position, the elevating frame is again raised to its upper limit, now carrying with it two tiers of blocks, one supported upon the other.

A third tier of blocks is then fed onto the stacking table and the process is repeated until the final tier of a stack arrives on the stacking table. The lowering process is then repeated as before, however, when the elevating frame arrives at its lowered position, a counter-controlled circuit actuates the clamp to square up the lowermost tier and then retracts the clamp and places the system on standby. When the first tier of blocks for the next subsequent stack is fed onto the stacking table, it pushes the now completed stack forwardly from the stacking table onto a gravity conveyor.

Other objects and features of the invention will become apparent by reference to the following specification and to the drawings.

Figure 4:
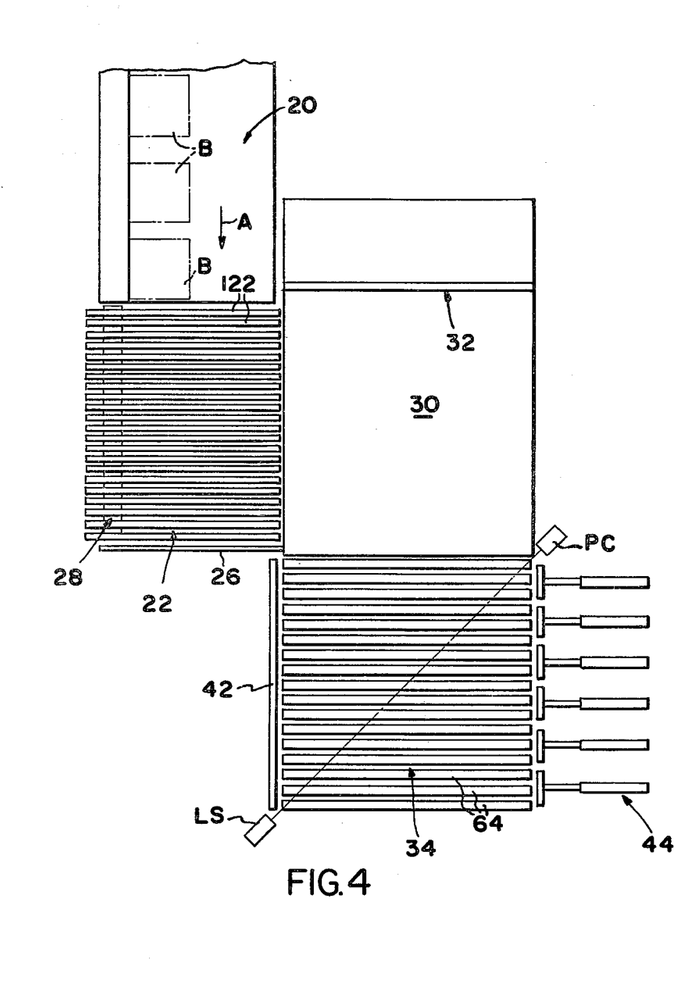
FIG. 4 is a top plan view of the machine with certain parts omitted.

The overall layout of a stack forming machine embodying the present invention may be best appreciated from a brief examination of the partial plan view of FIG. 4 and the end views of FIGS. 9 through 13. Referring first to FIG. 4, an infeed conveyor, designated generally 20, is employed to feed concrete blocks B in line onto a column accumulation and transfer table designated generally 22. The blocks roll across table 22, in the direction of the arrow A, into abutment with a fixed stop 26 and, when a column of block consisting of a predetermined number of blocks have been accumulated in line, a transfer mechanism designated generally 28 transfers the column of block in the direction of the arrow T onto a tier accumulation table designated generally 30—compare FIGS. 5 and 6.

Figure 8:
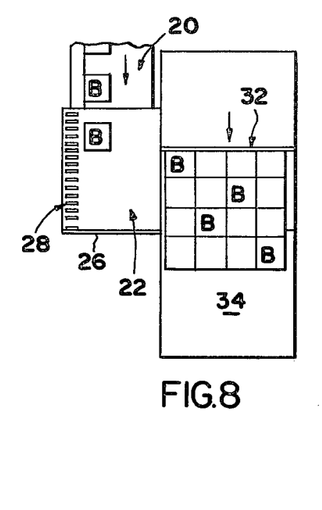

When a tier of blocks has been assembled on table 30, a pusher designated generally 32 pushes the completed tier, as indicated in FIG. 8, onto a stacking table designated generally 34.

All of the components described thus far may be said to constitute a main frame designated generally 36 (see FIGS. 9 through 13) of the machine. Referring now to FIGS. 9 through 13, an elevating frame designated generally 38 is mounted upon main frame 36 by four hydraulic motors 40 for vertical movement relative to main frame 36. Elevating frame 38 projects upwardly at two opposed sides of stacking table 34 and includes a fixed or stationary clamp member 42 and a series of movable clamp members designated generally 44. In the plan view of FIG. 4, clamp members 42 and 44 are the only portions of elevating frame 38 illustrated in FIG. 4. All components of the elevating frame have been omitted from FIGS. 5 through 8.

Returning to FIGS. 9 through 13, in addition to the clamping members 42 and 44, elevating frame 38 also carries opposed series of horizontally disposed tines 46 which may be projected into and out of overlapping relationship with stacking table 34—compare FIGS. 9, 10 and 13 showing the tines 46 projected with FIGS. 11 and 12 which show the tines 46 in their retracted position. Hydraulic motors 48 are employed to shift the tines between their projected and retracted positions. The relationship between motors 48 and tines 46 as schematically illustrated in FIGS. 9 through 13 is a schematic showing which differs from the actual mechanical arrangement employed in the machine best seen in FIG. 1. Similarly, the relationship between the hydraulic motors 50 employed to actuate the movable portions 44 of the clamp assembly likewise as schematically indicated in FIGS. 9 through 13 and a modified form of mechanical arrangement, as shown in FIG. 1 is employed in the actual machine.

Figure 1:
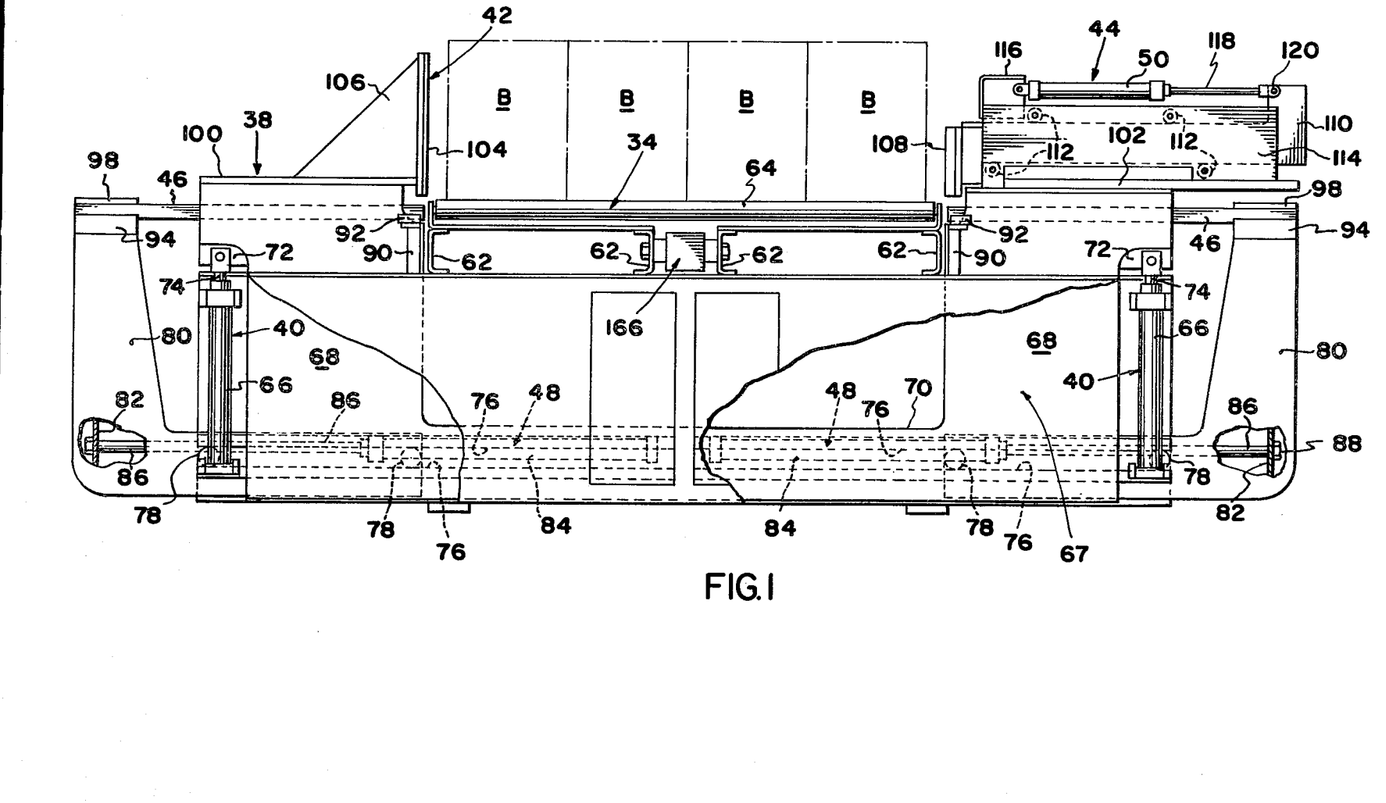
FIG. 1 is a view looking into the outfeed end of the machine, with certain parts broken away.
Figure 2:
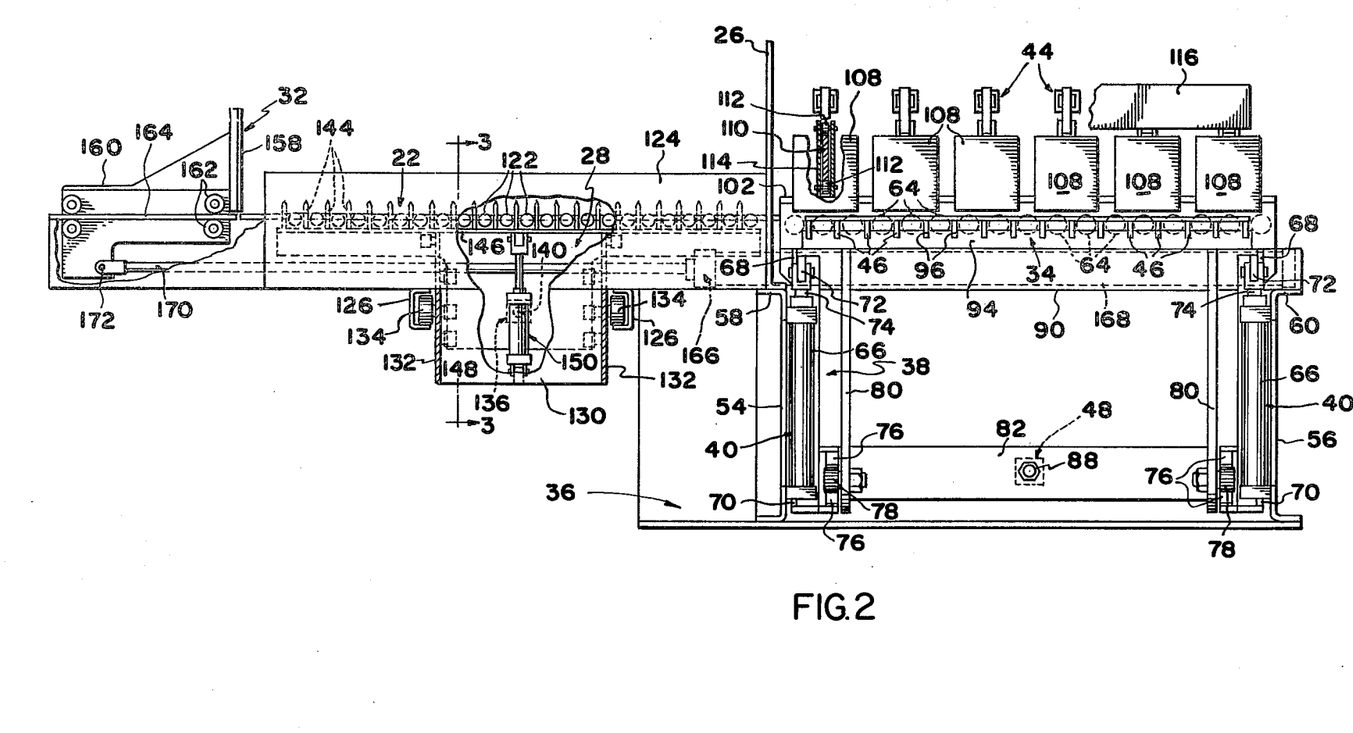
FIG. 2 is a side elevational view of the machine with certain parts omitted.

Referring now to FIGS. 1 and 2, and first to FIG. 2, the main frame 36 of the machine includes a base member 52 having upwardly projecting rear legs 54 and front legs 56 fixedly secured to and projecting upwardly from base 52. The legs are in approximate vertical alignment with the four corners of stacking table 34. Angle members 58 and 60 extend horizontally laterally between the respective pairs of front and rear legs 54 and 56 to support longitudinally extending channel frame members 62 which in turn support, as best seen in FIG. 1, the series of conveyor rollers 64 which define the block supporting surface of stacking table 34. The cylinders 66 of elevating motors 40 are supported at their lower ends upon main frame 36, four motors 40 being employed.

Elevating frame 38 includes what might generally be described as a pair of vertically disposed U-shaped plates 67 which, referring to FIG. 1, include upright sections 68 interconnected by a base portion 70. The plates 67 are almost totally obscured in FIG. 2 in that they lie behind the cylinders 66 of motors 40 in that Figure, however, a tiny portion of the base portion 70 appears below the bottom of cylinder 66, while a small portion of the upright sections 68 appear immediately above the motors. The plates 72 to which the piston rods 74 of motors 40 are connected are welded to a face of the upright portions 68 of plates 67. Roller tracks 76 are fixedly mounted upon base portion 70 of the U-shaped member 67 to receive guide rollers 78 which support general L-shaped tine carrying members 80. Four L-shaped members 80 are provided, the L-shaped members at the left and right hand sides of the machine as viewed in FIG. 1 being respectively interconnected by a cross member 82. The cylinders 84 of tine actuating motors 48 are fixedly mounted on elevating frame 38, the piston rods 86 of motors 48 being connected to the cross members 82 of the L-shaped tine carriers 80 as at 88.

The upright portions of U-shaped elevated frame 67 are interconnected by longitudinally extending frame members 90 which each support, along their top surfaces, longitudinally extending transversely slotted tine support and guide members 92. The upright legs of L-shaped tine carrying members 80 are also similarly connected by the longitudinally extending frame member 94 which is also transversely slotted as at 96 to receive the individual tines 46. The transverse slots 96 in the frame member 94 on tine carriers 80 receive the tines 46 with a relatively tight press fit, while the corresponding transverse slots in members 92 on elevating frame 67 receive the tines to a loose sliding fit. A clamping plate 98 is fixedly secured, as by bolts, not shown, to the tine carrier frame members 94 to fixedly lock the tines to tine carriers 80. As best seen in FIG. 1, tine carriers 80 are supported for horizontal movement on elevating frame 67 by rollers 78, and are reciprocated in horizontal movement, guided by rollers 78, by actuation of motors 48. Tines 46 thus slide horizontally through elevating frame members 92 between the retracted position shown in FIG. 1 and a projected position wherein the tines 46 on opposed sides of table 34 substantially meet each other at the center of table 34. From FIG. 1, it will be noted that the top surfaces of tines 46 are located slightly below the supporting surfaces of rollers 64 of table 34 when the elevating frame 67 is in the fully lowered position shown in FIG. 1. As best seen in FIG. 2, the tines 46 are aligned with the spaces between rollers 64 of table 34.

The upper surfaces of the U-shaped elevating frame member 67 are further interconnected by horizontally extending frame plates 100 which form platforms for mounting the clamp assembly. Referring to FIG. 1, the plate 100 at the left side of elevating frame 38 mounts the stationary clamp assembly 42 which includes a vertical plate 104 which extends the entire length of table 34 and is supported in a vertical position upon plate 100 as by a plurality of triangular brace plates 106 welded to the respective members 100 and 104.

At the opposite side of elevating frame 38 as viewed in FIG. 1, the movable clamp assembly includes a plurality of individual clamping pads 108 (see FIG. 2), each of which is fixedly mounted upon a generally L-shaped clamping pad support member 110. Each pad carrier 110 is slidably received between and guided by side plates 114 fixedly secured to frame plate 102, rollers 112 which engage the upper and lower surfaces of each member 110 being rotatably mounted in the plates 114 (see left hand clamp pad 108 of FIG. 2).

A longitudinally extending frame member 116, only partially shown in FIG. 2, is secured to the inner upper ends of guide plates 114 and extends the entire length of table 34 to serve as a mounting for the cylinders 50 of clamp pad actuating motors 44, one cylinder being provided for each of the clamp pads. The piston rods 118 of cylinders 50 are coupled to the pad carriers, as best seen in FIG. 1, as at 120. In FIG. 1, the movable clamp pads 108 are shown in their retracted position with the piston rods 118 of cylinders 50 fully extended. Actuation of the motors 50–118 to retract the piston rod will drive the clamp pads 108 to the left as viewed in FIG. 1 into engagement with the blocks B to shift the tier of blocks to the left as viewed in FIG. 1 to compressively grip the blocks B between the individual pads 108 and the common stationary clamp member 42.

Figure 3:
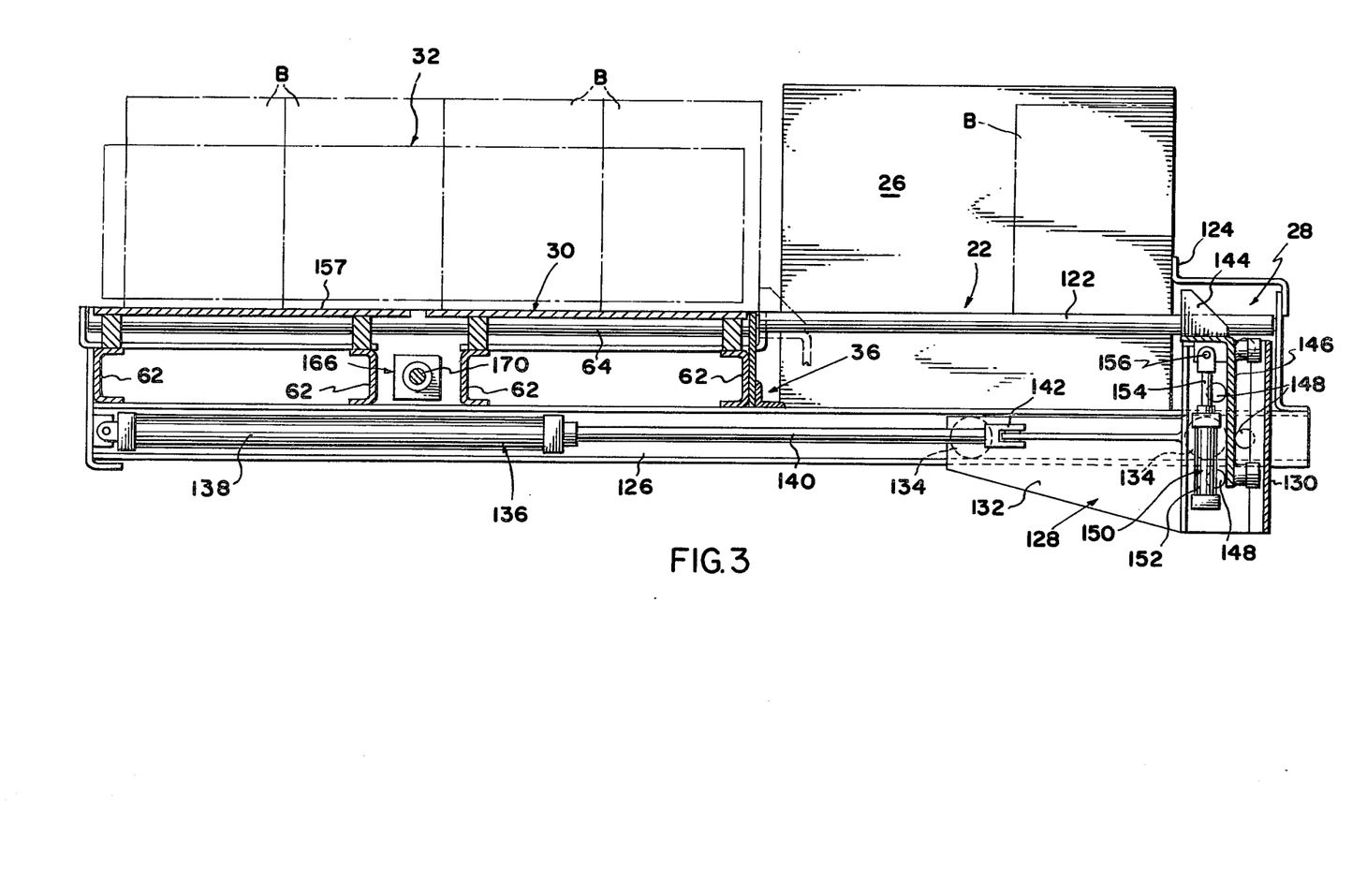
FIG. 3 is a cross sectional view taken on the line 3—3 of FIG. 2.

Details of the column and tier assembly tables 22 and 30 are best seen in FIGS. 2 and 3. The block supporting surface of table 22 is defined by a plurality of conveyor rollers 122 mounted for free rotation upon main frame 36. Stop plate 26 is fixedly mounted upon main frame 36 at the downstream end of table 22, while a side guide frame member 124 extends along one side of table 22 to guide the incoming blocks. Also fixedly mounted on fixed frame 36 are a pair of horizontal track members 126.

The mechanism for transferring columns of block assembled on table 22 onto the tier assembly table 30 includes a transfer frame assembly designated generally 128 which includes a generally vertically extending main frame plate 130 fixedly secured to a pair of side plates 132 which project perpendicularly from plate 130 to mount, upon each side plate 132, a pair of rollers 134 which are received in the horizontal tracks 126 on main frame 36. The transfer frame assembly is thus mounted for horizontal movement from right to left as viewed in FIG. 3. A hydraulic motor designated generally 136 has its cylinder 138 connected to fixed frame 36, while the piston rod 140 of motor 136 is coupled to the transfer frame 128 as at 142 to drive the transfer frame and movement along tracks 126.

A series of transfer figures 144 are mounted on a finger frame 146 which is mounted for guided vertical reciprocation upon transfer frame 128 as by a series of rollers 148 which are rotatably mounted upon the transfer frame and guide finger frame 146 in vertical movement. A hydraulic motor 150 includes a cylinder 152 fixedly mounted upon transfer frame 128 and a piston rod 154 which is coupled to finger frame 146 as at 156 to drive the finger frame in vertical movement upon transfer frame 128. In FIGS. 2 and 3, the finger frame is shown at its extreme upper limit of movement wherein the fingers 144 project upwardly between rollers 122 of table 22. When piston rod 154 of motor 150 is retracted, it draws finger frame 146 downwardly to a location such that the tips of fingers 144 are disposed below the conveying surfaces of rollers 122.

The surface of tier accumulation table 30 is formed as a flat plate 157. Referring now to FIG. 2, pusher 32 includes a vertically disposed plate 158 which is mounted upon a pusher frame 160 supported and guided by rollers 162 carried by pusher frame 160 which ride along flange like tracks 164 on fixed frame 36. Pusher frame 160 is driven in horizontal reciprocatory movement by a hydraulic motor designated generally 166 whose cylinder 168 is fixedly mounted on main frame 36 and whose piston rod 170 is coupled to pusher frame 160 as at 172. As is apparent from FIG. 2, motor 166 is an extremely long stroke motor capable of driving the pusher 32 from its retracted position shown in full line in FIG. 2 to a tier advancing location slightly to the right of stop plate 26 as viewed in FIG. 2.

TIER FORMATION

Block to be stacked by the apparatus described above is fed in single line onto the column assembly table 22 from infeed conveyor 20. The manner in which tiers are formed for transfer to stacking table 34 is best seen by reference to FIGS. 5 through 8 and to FIGS. 14 through 16.

Figure 15:
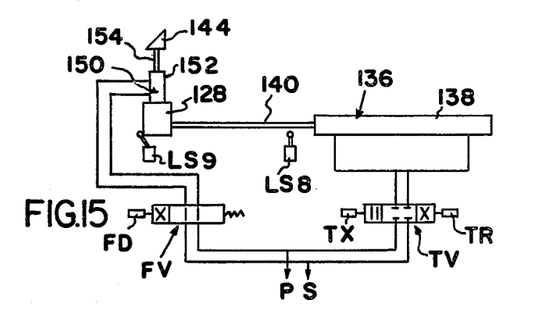
FIG. 15 is a schematic diagram of the hydraulic control circuit for the tier forming system of the machine.

Referring first to FIG. 15, it is seen that fluid under pressure is supplied to and conducted from transfer motor 136 and finger motor 150 from a schematically illustrated hydraulic system which includes a source of fluid under pressure P and a return line or sump S. Transfer motor 136 is connected to the pressure P and sump S lines via a solenoid controlled three position four way reversing valve TV, while finger motor 150 is coupled to lines P and S via a two position four way reversing valve FV normally spring biased to the straight through connections of the valve so that piston rod 154 of motor 150 is normally extended to position the fingers 144 in their elevated transfer position. In order to lower the fingers, solenoid FD must be energized to establish the cross sections of valve FV to retract the fingers 144 to their non operative position.

Transfer motor 136 is schematically shown in FIG. 15 in its fully extended position with its control valve TV located in its centered or blocking position. The transfer frame 128, with piston rod 140 of motor 136 fully extended as indicated in FIG. 15, is located in what will be referred to as the transfer retracted position—that is, the transfer assembly is withdrawn clear of the path of block moving onto the column assembly table 22 and is ready to commence the transfer operation. When in this position, transfer frame 128 engages and depresses the striker of a limit switch LS9, indicating the transfer mechanism to be in its fully retracted position. A second limit switch LS8 shown in FIG. 15 is engaged and actuated by transfer frame 128 when the transfer frame is in its fully extended column transferred position. Solenoids TX and TR shown in FIG. 15 are operable, when respectively actuated, to establish the straight through (transfer extend) or crossed connections (transfer retract).

Figure 16:
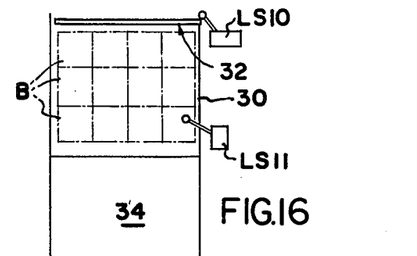
FIG. 16 is a diagrammatic plan view of the tier assembly table and the stacking table, showing the location of certain limit switches.

The schematic diagram of FIG. 16 illustrates the location of two additional limit switches LS10 and LS11. Limit switch LS10 is actuated when the tier pusher plate 32 is in its fully retracted position and functions in the control circuit of FIG. 14, as will be described below, to prevent the transfer of a column unless the pusher element 32 is fully retracted. Limit switch LS11 is located at the far side of tier accumulation table 30 and is actuated on the completion of the tier to perform a function to be described below in connection with the description of the electrical control circuit of FIG. 14.

Figure 14:
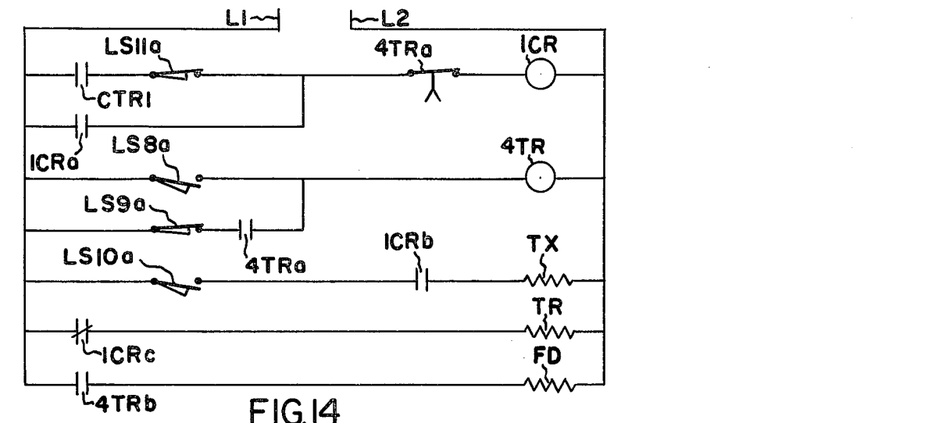
FIG. 14 is a schematic diagram of an electrical control circuit for the tier forming system of the machine.

Operation of the tier assembly portion of the machine is as follows. As an initial condition, it will be assumed that the situation is that illustrated in FIG. 4 with the first of a line of blocks B just moving on to table 22. At this time, transfer mechanism 28 is retracted, as is tier pusher 32. Limit switches LS8, 9, 10 and 11 are in the positions shown in FIGS. 15 and 16, limit switch LS9 being actuated, as is LS10, while limit switches LS8 and LS11 are in their unactuated positions. At this time, all of the relays and solenoids shown in FIG. 14 are deenergized, with valves FV and TV in the position illustrated in FIG. 15.

Figure 5:
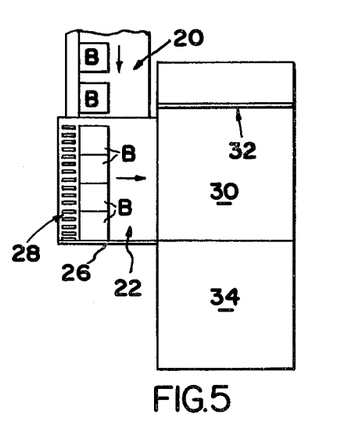
FIGS. 5, 6, 7 and 8 are diagrammatic plan views of the machine showing sequential steps in the formation of a tier of blocks.

As the blocks B move on to column accumulation table 22, they accumulate into a column as indicated in FIG. 5. Any of several means may be employed to initiate a switch closure in response to the completion of an assembly of a column upon table 22, for present purposes, it will be assumed that a counter switch is employed for this purpose, having normally open contacts CTR1 in FIG. 14 which close to indicate the completion of assembly of a column as shown in FIG. 5. Closure of contacts CTR1 completes a circuit to a control relay 1CR via a set of normally closed contacts of limit switch LS11, these contacts being contacts LS11a, and a set of normally closed delayed opening contacts 4TRa to control relay 1CR. As soon as relay 1CR is energized, it closes a set of lock in contacts 1CRa which bypass the counter contacts and contacts LS11a.

Energization of relay 1CR also closes a set of contacts 1CRb which energize solenoid TX via closed limit switch contacts LS10a, these latter contacts being closed at this time by the location of tier pusher 32 in its fully retracted position. Simultaneously with the closure of contacts 1CRb, contacts 1CRc open to deenergize solenoid TR.

Figure 6:
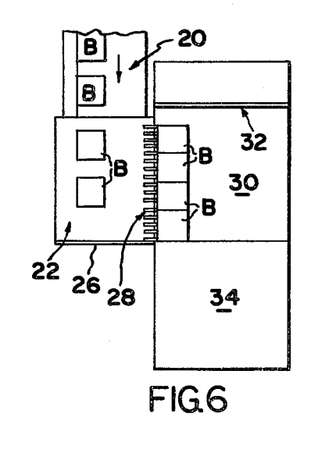

Energization of solenoid TX shifts valve TV to the straight through connection, supplying pressure to the rod end of cylinder 138 and connecting the head to sump, thus retracting piston rod 140 and causing transfer frame 128 to stroke toward its extended position, thus pushing the accumulated column block to the right from the FIG. 5 position toward the FIG. 6 position. The spring of finger control valve FV has been and still is holding the valve FV in the straight through connection position, thus maintaining fingers 144 in their elevated position. It will be noted from FIG. 6 that blocks B continue to flow from infeed conveyor 20 while the column transfer is taking place so that assembly of the next column to be transferred is taking place during the transfer operation.

As transfer frame 128 moves away from its retracted position, limit switch LS9a shifts to its unactuated position, thus permitting closure of normal closed contacts LS9a.

When transfer frame 128 arrives in its fully extended position—that shown in FIG. 6, the frame engages and actuates limit switch LS8 to close contacts LS8a, thereby energizing timing relay 4TR. Relay 4TR is immediately locked in by closure of contacts 4TRa via the normal closed contacts LS9a. Energization of relay 4TR immediately closes contacts 4TRb to energize the finger retracting solenoid FD of valve FV, reversing the hydraulic connections of motor 150 and retracting the piston rod and fingers 144.

Normal closed contacts 4TRa open a predetermined time delay after the energization of relay 4TR to deenergize control relay 1CR and shift contacts 1CRa, 1CRb and 1CRc back to their normal positions.

The normal closed contacts 1CRc energize solenoid TR of the transfer motor valve to establish the cross connections, thus causing the piston rod 140 to stroke back toward its retracted position. Opening of contacts 1CRb simultaneously deenergizes solenoid TX.

Motor 138 continues to stroke to drive transfer frame 128 back to its fully retracted position, fingers 144 remaining in their retracted position. When the transfer frame arrives in its fully retracted position, limit switch LS9 is actuated to open contacts LS9a, thereby deenergizing relay 4TR. Deenergization of relay 4TR opens contacts 4TRb, thus deenergizing solenoid FD to permit the spring of valve FV to restore the finger control valve to its normal straight through connections, thus elevating the fingers 144 in readiness for a subsequent transfer.

Figure 7:
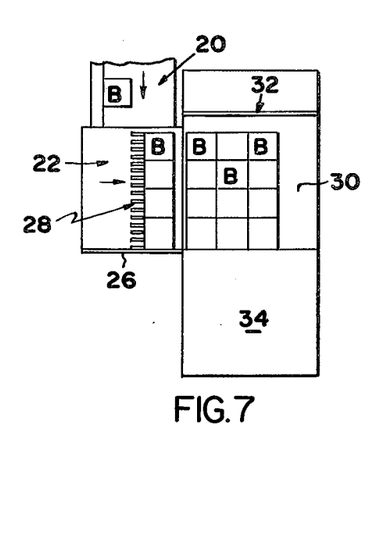

Subsequent columns are cyclically assembled and transferred as described above. Each successive column is transferred by transfer mechanism 28 to the position of the column of blocks B on table 30 in FIG. 6, the arrival of each new column of blocks pushing previously transferred columns one step across table 30 as indicated in FIG. 7. When the final column to complete a tier of blocks is finally located on table 30, the right hand column of the tier contacts the striker of limit switch LS11, thus opening contacts LS11a so that the completion of the next subsequent of column of block on table 22 cannot energize control relay 1CR to commence a subsequent transfer cycle. Limit switch LS11 has a second set of contacts which will be referred to below which, when closed, will initiate a tier transfer step by actuating pusher 32 at an appropriate time in the stack forming cycle.

STACK FORMING

Figure 17:
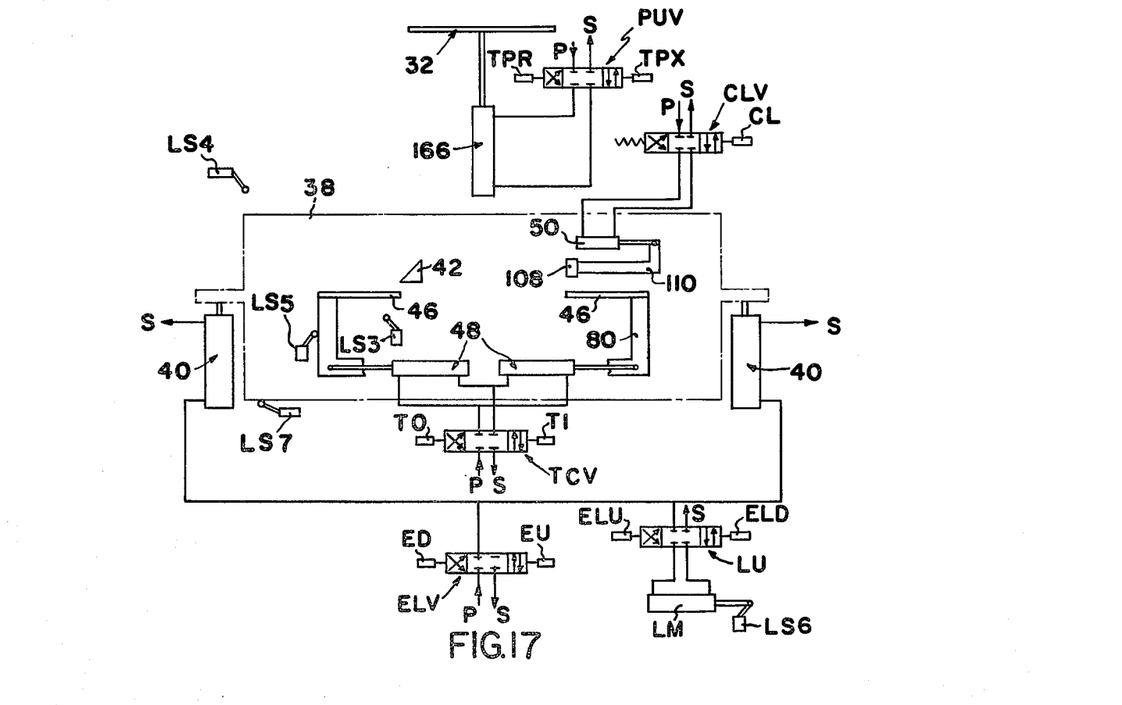
FIG. 17 is a schematic hydraulic diagram of the stacking system of the machine.
Figure 18:
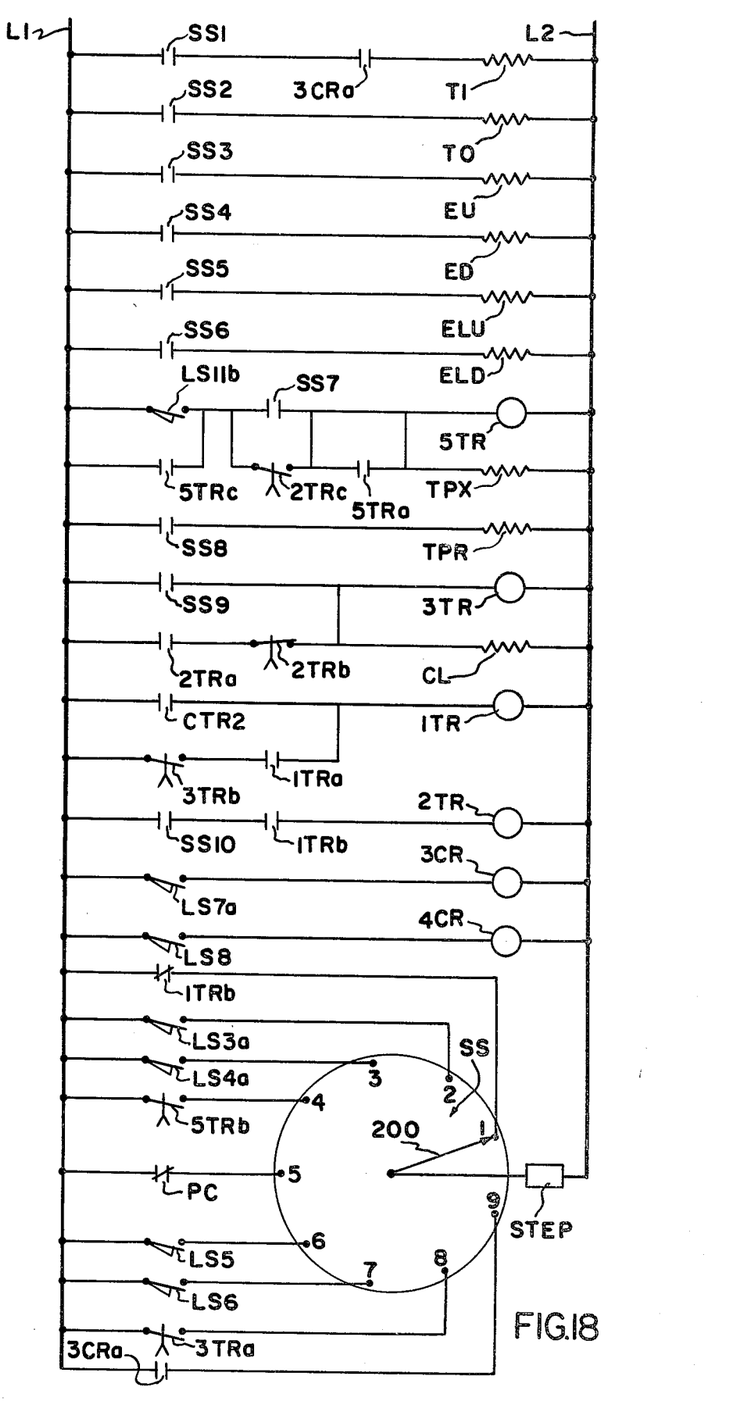
FIG. 18 is a schematic diagram of an electrical control circuit for the hydraulic system of FIG. 17.
Figure 19:
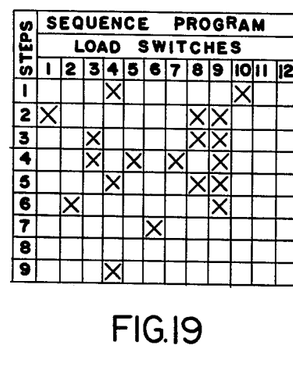
FIG. 19 is a chart of the switching program of the stepping switch of FIG. 18.

Schematic diagrams of the hydraulic and electrical control circuits for the stacking operation are shown in FIGS. 17, 18 and 19.

In the hydraulic diagram of FIG. 17, the various hydraulic motors and portions of the mechanical structure are indicated. Only two of the four elevator motors 40 and one of the six clamp actuating motors 50 are shown. All of the clamp actuating motors 50 are commonly connected via a manifold type connection to the clamp operating valve CLV, and a similar arrangement is employed with the four elevator motors 40. Retracting movement of the piston rods of the elevator motors 40 is by gravity, (the weight of the supported elevating frame being substantial) hence the rod ends of these motors, in the schematic diagram is illustrated as being connected to a sump S. The connections P to the various valves indicate a high pressure supply line, while the reference S is employed in FIG. 17 to designate a sump connection.

In addition to the various motors which shift the mechanical elements of the machine during the stacking operation, the hydraulic diagram of FIG. 17 also includes a limit motor LM coupled to actuate a limit switch LS6 for a purpose to be described in detail below.

The stacking sequence is shown generally in FIGS. 9 through 13 and is performed by the hydraulic circuit of FIG. 17 under the control of an electrical control circuit schematically shown in a simplified form in FIG. 18. The sequence of steps is primarily under the control of a rotary stepping switch designated generally SS in FIG. 18 having a rotary member 200 which is driven in step by step rotation upon each successive energization of a step stepping motor STEP. The stepping member 200 is operable at various steps to close selected ones of a plurality of stepping switch contacts SS1–SS10 in accordance with the program shown in FIG. 19. For example, FIG. 19 shows that when the stepping element is located at step 1, only contacts SS4 are closed, while when the stepping switch is at step 6, contacts SS2 and SS9 are closed. A stepping movement of member 200 is initiated when a circuit is completed from supply line L1 to supply line L2 via one of the contacts connected to the individual stepping buttons, the stepping member 200 and the STEP motor—that is with the stepping member 200 engaged with the step 1 contact, when normal closed contacts 1TR*a* are closed the stepping motor will be actuated to shift stepping member from step 1 to step 2.

Figure 9:
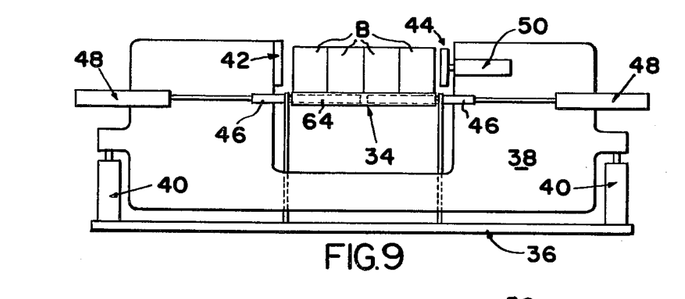
FIGS. 9, 10, 11, 12 and 13 are diagrammatic end views of the machine, similar to FIG. 1, showing sequential steps in the formation of a stack of block.

As an initial condition, the apparatus will be considered to be in the position shown in FIG. 9, with the exception that the tines 46 will be assumed to be withdrawn. It will be assumed that a tier of blocks has just arrived upon stacking table 34, and the stepping switch element 200 is in the step 1 position as shown in FIG. 18. At this time, (see FIG. 19) stepping switch contacts SS4 are closed and the elevator down solenoid ED is energized so that the cross connections of valve ELV are made, connecting the head ends of the cylinders of motors 40 to sump. With the exception of relay 3CR, all of the other solenoids and relays of FIG. 18 are at this time deenergized. Relay 3CR is energized because limit switch LS7 is closed—the elevating frame 38 is at its lower end limit of movement in which limit switch LS7 is actuated.

Step 1 of the stepping switch is employed in the completed stack ejecting operation, which will be described below—at this time however normal closed contacts 1TR*b* are closed and the stepping member 200 moves immediately one step counterclockwise on to step 2. From the program of FIG. 19, it is seen that when member 200 is at step 2, stepping switch contacts SS1, SS8, and SS9 are closed. Closure of contacts SS1 energizes the tines extend solenoid TI to shift valve TCV (FIG. 17) to the straight through connections to cause motors 48 to stroke in a direction moving the tines to their extended position shown in FIG. 9. Contacts 3CR*a* are closed at this time because the elevating frame 38 is at its lowered position, closing contacts LS7*a* to energize relay 3CR.

Closure of contacts SS8 energizes the tier push return solenoid TPR to cause the tier pusher motor 166 to hold the pusher member 32 in its retracted position to prepare for the transfer of a subsequent tier of blocks to table 34.

Closure of contacts SS9 simultaneously energizes relay 3TR and the solenoid CL of clamping valve CLV to cause motors 50 to stroke in a direction driving the clamps 44 into clamping engagement with the tier of blocks, compressively gripping the tier between the movable clamp members 108 and the stationary clamp member 42. With the tines fully extended and the clamps engaged, the elevating frame is ready to be elevated.

When tines 46 are fully extended, limit switch LS3 is engaged and contacts LS3*a* close to complete a circuit to the stepping motor through the stepping element 200 which at this movement is at step 2. The stepping element is thus shifted to step 3.

Referring to FIG. 19, it is seen that at step 3 contacts SS3, SS8 and SS9 are closed. Closure of contacts SS3 energizes the elevator up solenoid EU to connect elevator motors 40 to stroke upwardly, elevating frame 38 with the tier of blocks compressively gripped between the movable clamps 44 and stationary clamp 42. It will be noted from FIG. 10 that while tines 46 extends beneath the clamped tier of blocks, the tier of blocks do not actually contact the tines. The tines are employed as a safety measure in the case of slippage or loss of pressure in motors 50 and do not, in the normal course of operation, perform any actual supporting of the block. With stepping element 200 at step number 3, motors 40 continue to stroke upwardly until elevating frame 38 arrives at its uppermost position, at which time it engages the striker of limit switch LS4 to close contacts LS4*a*, thereby advancing stepping element 200 to step 4.

Referring to FIG. 19 it is seen that in step 4 stepping switch contacts SS3 and SS9 remain closed to maintain elevating pressure on motors 40 and to maintain pressure at clamping cylinders 50.

In addition, at step 4 stepping switch contacts SS5 and SS7 are closed. Contacts SS5 energize solenoid ELU to actuate limit switch motor LM to its retracted position, cocking the actuator of limit switch LS6 for an action to take place later in the cycle. Closure of contacts SS7 conditions the tier push extending solenoid TPX to be ready to energize upon the completion of the next subsequent tier, to be detected by the closure of limit switch LS11, as described above in connection with the tier formation operation, contacts LS11*b* closing when the tier is completed. When contacts LS11*b* close and contacts SS7 are closed, a relay 5TR is energized to initiate a delayed closing of contacts 5TR*a* which, when closed, energize the tier push extend relay TPX to cause motor 166 to push the next tier into position beneath the elevated first tier, as indicated in broken line in FIG. 10. Energization of relay 5TR also initiates a delayed closing of contacts 5TR*b* which initiate a stepping movement of step element 200 to step 5.

With the stepping element at position 5, contacts SS4 are closed, as are contacts SS8 and SS9. Closure of contacts SS4 energizes the elevator down solenoid ED, connecting the head ends of elevator motors 40 to sump.

Elevating frame 38 continues to lower until the lowering tines 46 block the light beam between light source LS and photocell PC (shown only in FIGS. 4 and 10) to close contacts PC and jog stepping element 200 from step 5 to step 6.

Figure 10:
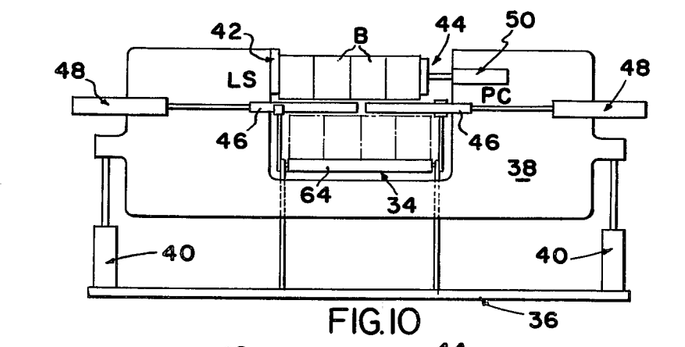
Figure 11:
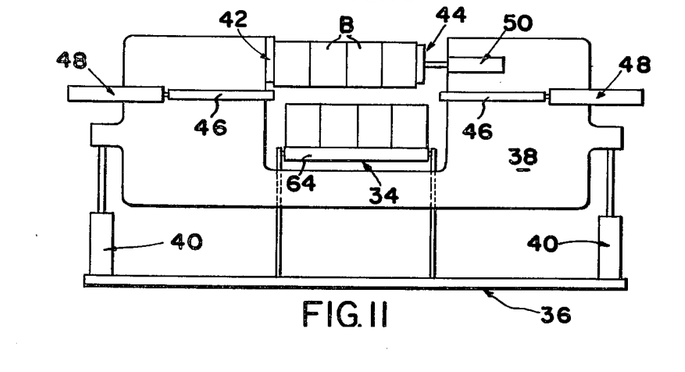
Figure 12:
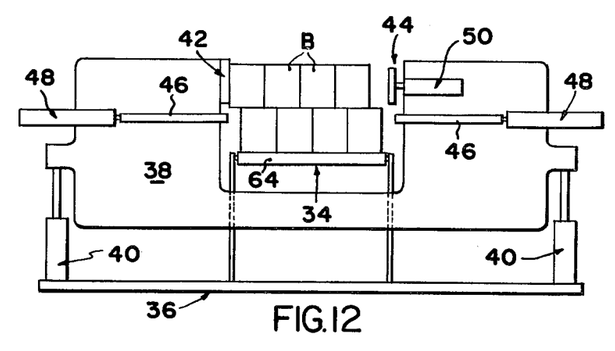

In moving away from step 5, contacts SS4 are opened and the elevator control valve ELV returns automatically to its centered position, holding the elevating frame at a partially elevated position illustrated in FIG. 10 in which the extended tines clear the second tier of blocks supported upon table 34 by about a quarter of an inch. Upon arrival at step 6, stepping switch contacts SS2 are closed to energize the tines retract solenoid T0 which connects motors 48 as in FIG. 11. When the tines arrive at their fully retracted position, contacts LS5a are closed to advance stepping element to step 7.

In step 7 a controlled lowering of elevating frame 38 is performed which lowers the elevating frame approximately two inches so that the tier of blocks clamped between movable clamp 44 and stationary clamp 42 is gently lowered onto the upper surface of the lower tier of block supported upon table 34. This lowering action is accomplished by the limit motor LM. Upon arrival at step 7, stepping switch contacts SS6 are closed to energize the elevating limit down solenoid ELD which establishes the straight through connections of valve LV. Thus, the head ends of elevating motors 40 are connected via valve LV to the head end of limit motor LM. The magnitude of the weight supported upon motors 40 is such that fluid under pressure is expelled from the head ends of the cylinders of motors 40 into the head end of limit cylinder LM, causing the piston rod of motor LM to stroke outwardly to its end limit. Arrival of the piston rod at its end limit is achieved when a predetermined amount of fluid has been expressed from motors 40, hence the piston rods of motors 40 move downwardly a slight distance to thereby lower the clamped tier of block onto the tier of block supported upon table 34. The consequent stroking of limit motor LM is also employed to actuate limit switch LS6 to close contacts LS6a to shift the stepping switch to step 8.

At step 8, none of the stepping switch contacts are closed. Specifically it may be noted that at this time contacts SS9 open, thus deenergizing relay 3TR and the clamp relay CL. The hydraulic connections of the clamping cylinders 50 are reversed as valve CLV shifts under the influence of its valve spring, thus causing motor 50 to stroke in a direction retracting clamps 108 clear of the uppermost tier. This is the situation illustrated in FIG. 12.

Figure 13:
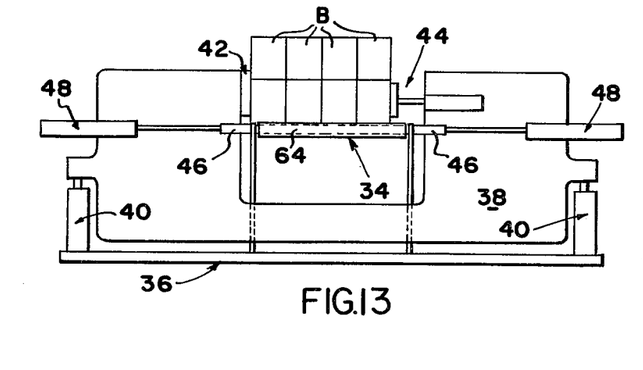

Deenergization of relay 3TR causes a delayed closing of contacts 3TRa, this delayed closing affording time for the clamp elements to be withdrawn to their fully retracted position. When contacts 3TRa close, stepping element is advanced to step 9 which closes contacts SS4 to lower the elevating frame 38 to its fully lowered position. Upon arrival at its lowered position, contacts LS7a close, energizing relay 3CR to close contacts 3CRa to advance stepping member 200 from step 9 to step 1. The system is thus conditioned to repeat the cycle by inserting tines 46 beneath the second layer, engaging the clamps, as indicated in FIG. 13, and subsequently raising the elevating frame to lift the two tiers of block clear of table 34 so that a subsequent tier can be advanced in position.

The cycle described above is repeated until the desired number of tiers are stacked one on each other to form a completed stack or "cube". Completion of the stack is accomplished by counting each tier by a counting switch as it arrives in position upon stacking table 34. Upon arrival of the final tier in position upon table 34, the tier count is complete and counting switch contacts CTR2 of FIG. 18 close to energize relay 1TR. Energization of relay 1TR opens 1TRb so that the stepping element will be halted at step 1. Relay 1TR is locked in by lock in contacts 1TRa and normal closed contacts 4CRa. With the stepping switch number 200 at position 1, contacts SS10 are closed to energize, via now closed contacts 1TRb, a timing relay 2TR. Relay 2TR is employed to accomplish a timed actuation of clamp motors 50 via contacts 2TRa which close upon energization of relay 2TR and delayed opening contacts 2TRb which open a predetermined time interval after the energization of relay 2TR. This action energizes the clamp valve solenoid CL momentarily to cause the clamps to extend to align the lowermost tier of block with those supported above it prior to the discharge of the stack. Relay 3TR is energized simultaneously with the clamp solenoid and provides a delayed opening of contacts 3TRb to deenergize relay 1TR and 2TR upon the opening of contacts 3TRb.

The completed stack is ejected from table 34 by the arrival of the next tier of block.

While one embodiment of the invention has been described, it will be apparent to those skilled in the art that the disclosed embodiment may be modified. Therefore, the foregoing description is to be considered exemplary rather than limiting, the true scope of the invention is that defined in the following claims.

I claim:

1. Apparatus for assembling a multi-tier stack of concrete blocks or like articles comprising a main frame, a table on said main frame operable to receive and support a stack of blocks, an elevating frame having a pair of opposed frame sections extending along two opposed sides of said table, actuable lift means mounting said elevating frame upon said main frame for vertical movement between a lowered position and an elevated position spaced above said lowered position by a distance exceeding the height of a tier of blocks, opposed cooperating clamp means mounted on said opposed frame sections of said elevating frame movable between a clamping position wherein said clamp means compressively grip a tier of blocks from two opposed sides thereof and a released position wherein the opposed clamp means are retracted from each other to a spacing exceeding the width of a tier of blocks, said clamp means being horizontally aligned with a tier of blocks supported on said table when said elevating frame is in said lowered position, power means actuable to drive said clamp means to and from said released position and said clamping position and being operable to maintain said clamp means in said clamped position with a force sufficient to support a multi-tier stack of blocks in an elevated position by compressively gripping two opposed sides of the lowermost tier in said stack, feed means actuable to feed tiers of blocks in succession onto said table, and control means for actuating said feed means, said power means and said lift means in a cycle including the following sequential steps:
   (1) said clamp means is moved by said power means to said clamping position to compressively grip a tier of blocks located on said table;
   (2) said lift means is actuated to move said elevating frame to said elevated position with the gripped tier of blocks carried by said clamp means;
   (3) said feed means is actuated to locate a successive tier of blocks on said table;
   (4) said lift means lowers said elevating frame to rest the gripped tier of blocks on said successive tier and said power means thereupon releases said clamp means; and
   (5) said lift means lowers said elevating frame to said lowered position to initiate a repetition of the cycle, said control means further comprising means responsive to the assembly of the final tier of a stack into the stack at step (5) of said cycle for temporarily preventing the repetition of said cycle and actuating said power means to move said clamp means momentarily to said clamping position to align said final tier with the tiers supported thereon and then retracting said clamp means.

2. Apparatus for assembling a multi-tier stack of concrete blocks or like articles comprising a main frame, a table on said main frame operable to receive and support a stack of blocks, an elevating frame having a pair of opposed frame sections extending along two opposed sides of said table, actuable lift means mounting said elevating frame upon said main frame for vertical movement between a lowered position and an elevated position spaced above said lowered position by a distance exceeding the height of a tier of blocks, opposed cooperating clamp means mounted on said opposed frame sections of said elevating frame movable between a clamping position wherein said clamp means compressively grip a tier of blocks from two opposed sides thereof and a released position wherein the opposed clamp means are retracted from each other to a spacing exceeding the width of a tier of blocks, said clamp means being horizontally aligned with a tier of blocks supported on said table when said elevating frame is in said lowered position, power means actuable to drive said clamp means to and from said released position and said clamping position and being operable to maintain said clamp means in said clamped position with a force sufficient to support a multi-tier stack of blocks in an elevated position by compressively gripping two opposed sides of the lowermost tier in said stack, feed means actuable to feed tiers of blocks in succession onto said table, and control means for actuating said feed means, said power means and said lift means in a cycle including the following sequential steps:

(1) said clamp means is moved by said power means to said clamping position to compressively grip a tier of blocks located on said table;

(2) said lift means is actuated to move said elevating frame to said elevated position with the gripped tier of blocks carried by said clamp means;

(3) said feed means is actuated to locate a successive tier of blocks on said table;

(4) said lift means lowers said elevating frame to rest the gripped tier of blocks on said successive tier and said power means thereupon releases said clamp means; and (5) said lift means lowers said elevating frame to said lowered position to initiate a repetition of the cycle, said table comprising a series of spaced conveyor rollers, tine means mounted on said opposed frame sections for movement between a projected position in underlying relationship with said stack and a retracted position withdrawn at opposite sides of said table, said tine means being vertically movable with said elevating frame through the spaces between said conveying rollers, said control means being operable to move said tine means to said projected position concurrently with the movement of said clamp means to said clamping position and being operable to move said tine means to said retracted position between steps (3) and (4) of said cycle, said tine means being located below the block engaging surfaces of said conveying rollers when said elevating frame is in said lowered position.

3. The invention of claim 2 wherein said control means includes detecting means operable during lowering movement of said elevating frame to stop lowering movement of said frame when said tine means is at a predetermined distance above a tier of blocks located on said table and to thereupon retract said tine means, and means responsive to the arrival of said tine means in its retracted position for initiating a controlled actuation of said lift means to lower said elevating frame by a predetermined distance to complete step 4 of said cycle.

4. Apparatus for assembling a multi-tier stack of concrete blocks or like articles comprising feed means for feeding individual tiers of blocks in succession to a work station, clamp means mounted at opposed sides of said work station operable to releasably clamp a tier of blocks from two opposite sides of said tier with a clamping grip sufficient to support a multi-tier stack of blocks in an elevated position by application of said clamping grip to two opposed sides of the lowermost tier of said stack, lift means operable to cyclically raise and lower said clamp means while cyclically operating said clamp means to clamp and to release tiers of blocks to elevate a tier of blocks from said work station to accommodate the feeding of a successive tier of blocks to said work station and then lowering the elevated tier onto stacked relationship with the successive tier, auxiliary tine means on said lift means movable to and from spaced underlying relationship with a tier of blocks clampingly gripped by said clamp means, and actuating means for projecting said tine means into said underlying relationship prior to and during raising movement of said lift means and for withdrawing said tine means before lowering said elevated tier onto said stacked relationship.

5. Apparatus for assembling a multi-tier stack of concrete blocks or like articles wherein each of said tiers consists of a plurality of rows and columns of blocks, said apparatus comprising feed means for feeding individual tiers of blocks in succession to a work station, clamp means mounted at opposed sides of said work station operable to releasably clamp a tier of blocks from two opposite sides of said tier with a clamping grip sufficient to support a multi-tier stack of blocks in an elevated position by application of said clamping grip to two opposed sides of the lowermost tier of said stack, clamp means comprising a first clamp member having a flat elongate vertical surface engageable with the entire length of the column of blocks at one side of said tier, a plurality of second clamp members respectively independently engageable with the individual blocks of the column of blocks at the opposite sides of said tier, and a plurality of fluid pressure actuated motors respectively coupled to said second clamp members for independently shifting said second clamp members into clamping engagement with said blocks, and lift means operable to cyclically raise and lower said clamp means while cyclically operating said clamp means to clamp and to release tiers of blocks to elevate a tier of blocks from said work station to accommodate the feeding of a successive tier of blocks to said work station and then lowering the elevated tier onto stacked relationship with the successive tier.

6. Apparatus as defined in claim 5 further comprising auxiliary tine means on said lift means movable to and from spaced underlying relationship with a tier of blocks clampingly gripped by said clamp means, and actuating means for projecting said tine means into said underlying relationship prior to and during raising movement of said lift means and for withdrawing said tine means before lowering said elevated tier onto said stacked relationship, said tine means including a plurality of spaced parallel horizontal tines movable into said underlying relationship from said one and said opposite sides of said tier.

7. Apparatus as defined in claim 6 wherein the spacing between said tines is such that at least two adjacent tines underlie each row of said blocks.

8. The method of stacking concrete blocks or like articles into a multi-tier stack comprising the steps of locating a first tier of blocks upon a work station, applying a compressive grip to said first tier from two opposite sides thereof, elevating said first tier vertically from said work station while maintaining said compressive grip on said first tier to a height accommodating the location of a second tier of blocks on said work station, locating a second tier on said work station in underlying relationship to the elevated first tier, lowering the compressively gripped first tier until said first tier is supported on said second tier, releasing the compressive grip from said first tier and applying the compressive grip to opposed sides of said second tier, elevating the compressively gripped second tier with said first tier supported thereon vertically from said work station to a height accommodating the location of a third tier of blocks on said work station in underlying relationship to the elevated first and second tiers, cyclically repeating the locating, gripping and elevating steps until the final tier of the multi-tier stack is located on said work station and has been compressively gripped to square up the final tier, interrupting the cyclic repetition of the locating, gripping and elevating steps at that point, releasing the compressive grip on said final tier, and moving the multi-tier stack clear of said table.

9. The method of stacking concrete blocks or like articles into a multi-tier stack comprising the steps of locating a first tier of blocks upon a work station, applying a compressive grip to said first tier from two opposite sides thereof, inserting an auxiliary safety support means into underlying spaced relationship to a tier of blocks at the time the compressive grip is initially applied thereto, elevating said first tier vertically from said work station while maintaining said compressive grip on said first tier while maintaining the safety support means in said underlying spaced relationship with the tier of blocks to a height accommodating the location of a second tier of blocks on said work station, locating a second tier on said work station in underlying relationship to the elevated first tier, lowering the compressively gripped first tier until said first tier is supported on said second tier, withdrawing said support means from beneath said first tier after an initial portion of the lowering of the first tier at a time when said support means is located a predetermined distance above the second tier, releasing the compressive grip from said first tier and applying the compressive grip to opposed sides of said second tier while reinserting said safety support means beneath said second tier, and elevating the compressively gripped second tier with said first tier supported thereon and with said safety means underlying said second tier vertically from said work station to a height accommodating the location of a third tier of blocks on said work station in underlying relationship to the elevated first and second tiers.

* * * * *